United States Patent [19]

Thomas et al.

[11] Patent Number: 5,322,987
[45] Date of Patent: Jun. 21, 1994

[54] PNEUMATIC HUB LOCKING DEVICE FOR ETCHING OPTICAL SERVO TRACKS ON MAGNETIC DISKS

[75] Inventors: Fred C. Thomas, East Kaysville; Paul R. Johnson, Kaysville, both of Utah

[73] Assignee: Iomega Corporation, Roy, Utah

[21] Appl. No.: 896,314

[22] Filed: Jun. 10, 1992

[51] Int. Cl.[5] ............................................. B23K 26/14
[52] U.S. Cl. ......................... 219/121.68; 219/121.84; 360/135; 369/44.11
[58] Field of Search ...................... 219/121.68, 121.69, 219/121.84; 369/44.11, 44.41; 360/135; 264/104

[56] References Cited

U.S. PATENT DOCUMENTS

| | | | |
|---|---|---|---|
| 4,406,939 | 9/1983 | Golker | 219/121.69 |
| 4,467,172 | 8/1984 | Ehrenwald et al. | 219/121.68 |
| 4,633,451 | 12/1986 | Ahn et al. | 369/14 |
| 4,831,470 | 5/1989 | Brunnett et al. | 360/75 |
| 4,935,835 | 6/1990 | Godwin et al. | 360/135 |
| 4,958,245 | 9/1990 | Roth et al. | 369/44.11 |
| 4,961,123 | 10/1990 | Williams et al. | 360/131 |
| 5,012,067 | 4/1991 | Sato et al. | 219/121.72 |
| 5,065,387 | 11/1991 | Roth et al. | 369/44.11 |
| 5,067,039 | 11/1991 | Godwin et al. | 360/135 |
| 5,120,927 | 6/1992 | Williams et al. | 219/121.68 |
| 5,210,672 | 5/1993 | Ivers et al. | 360/135 |

FOREIGN PATENT DOCUMENTS 2248575 4/1992 United Kingdom .

OTHER PUBLICATIONS

"An Introduction to the Insite 325 Floptical® Disk Drive", Godwin, J., *SPIE Optical Data Storage Topical Meeting* vol. 1078, pp. 71–79, (1989).

"Optoelectronics–An Introduction", Wilson, J., Hawkes, J. F. B., School of Physics, Newcastle upon Tyne Polytechnic, *Prentice/Hall International*.

Patent Abstracts of Japan, vol. 007, No. 187 (M-236) Aug. 16, 1993 & JP-a-58 086 924 (Sumitomo Denki Kogyo KK) May 24, 1993 * abstract *.

Y. Y. Fan and V. M. Huynh, "Investigation of Light Scattering From Rough Periodic Surfaces–Numbered Solutions", Dept. of Mech. Eng. Univ. of Windsor, Ontario, Mar. 1992.

J. Mazumder, "Overview of Melt Dynamics in Laser Processing", Optical Engin. vol. 30, No. 8, pp. 1208–1219 Aug. 1991.

M. W. Sasnett and T. F. Johnston, Jr., "Beam Characterization and Measurement of Propagation Attributes", Laser Beam Diagnostics, SPIE vol. 1414, Los Angeles 1991.

F. Jorgensen, "The Complete Handbook of Magnetic Recording" 3rd Edition, TAB Books, Inc., Blue Ridge Summit, Pa. 1988 pp. 119–121.

*Primary Examiner*—C. L. Albritton
*Attorney, Agent, or Firm*—Woodcock Washburn Kurtz Mackiewicz & Norris

[57] ABSTRACT

An apparatus for etching optical servo tracks on a magnetic storage disk comprises optics for generating a beam of light for etching the servo tracks and a spindle for rotating the disk in proximity to the optics. The device further comprises a center pin at the center of rotation of the spindle and an alignment pin which is off-center of the spindle. A disk to be etched is placed on the spindle with the center pin through a center hole in the disk hub. A pressurized gas nozzle directs bursts of pressurized gas toward the edge of the disk to rotate the disk until an alignment hole in the disk hub engages the alignment pin.

13 Claims, 7 Drawing Sheets

PNEUMATIC HUB LOCKING DEVICE FOR ETCHING OPTICAL SERVO TRACKS ON MAGNETIC DISKS

FIELD OF THE INVENTION

This invention relates to etching optical servo tracks on magnetic disks and more particularly to an automatic hub locking device for accurately positioning the magnetic disk on which servo tracks are to be etched.

RELATED APPLICATIONS

Steering Laser Beam While Etching Optical Servo Tracks, Ser. No. 896,188, filed Jun. 10, 1992; Apparatus for and Method of Verifying Etching of Optical Servo Information on Magnetic Media, Ser. No. 896,197, filed Jun. 10, 1992; and Acousto-Optical Intensity Control of Laser Beam During Etching of Optical Servo Information On Magnetic Media, Ser. No. 896,196, filed Jun. 10, 1992. The foregoing applications show the etching system to which the present invention relates.

BACKGROUND OF THE INVENTION

So-called "floppy" disk memory systems for "desk top" sized computers are well known in the art. Such systems employ magnetic storage disks having a diameter of either 5.25 inches or 3.50 inches. Conventional magnetic storage disks for floppy disk drives have a track density ranging from forty-eight (48) to one hundred thirty-five (135) tracks per inch (TPI). In contrast, optical storage disks for optical memory systems achieve track densities greater than 15,000 TPI. The greater track density of optical disks is achieved by the use of optical servos that maintain fine positioning of the optical read/write head over the data tracks on the disk. Typically, concentric optical servo tracks are pre-recorded on the optical disk to guide the servo mechanism.

New advances in barium-ferrite magnetic media have allowed bit densities of magnetic storage disks to exceed the bit densities of optical disks. However, as mentioned above, track densities of magnetic media (48-135 TPI) are many times less than their optical counterparts. This limits the overall capacity of magnetic disks as compared to optical disks. Conventional magnetic disk systems employ a magnetic servo mechanism and magnetically pre-recorded servo tracks on the disks to guide the read/write head. Magnetic servo systems cannot provide the fine positioning that optical servo systems can provide.

Recently, floppy disk systems have been developed that combine magnetic disk recording techniques with the high track capacity optical servos found in optical disk systems. Such a system is described in AN INTRODUCTION TO THE INSITE 325 FLOPTICAL(R) DISK DRIVE, Godwin, in a paper presented at the SPIE Optical Data Storage Topical Meeting (1989). Essentially, an optical servo pattern is pre-recorded on a magnetic floppy disk. The optical servo pattern typically consists of a large number of equally spaced concentric tracks about the rotational axis of the disk. Data is stored in the magnetic "tracks" between the optical servo tracks using conventional magnetic recording techniques. An optical servo mechanism is provided to guide the magnetic read/write head accurately over the data between the optical servo tracks. By utilizing optical servo techniques, much higher track densities are achievable on the relatively inexpensive removable magnetic medium.

As mentioned, the optical servo pattern typically consists of a large number of equally spaced concentric tracks about the rotational axis of the disk. As disclosed in U.S. Pat. No. 4,961,123, each track may be a single continuous groove (FIG. 3), a plurality of equally spaced circular pits (FIG. 8), or a plurality of short equally spaced grooves or stitches (FIG. 9). Various methods and systems exist for inscribing the optical servo tracks on the magnetic medium.

For example, U.S. Pat. No. 5,067,039, entitled "High Track Density Magnetic Media with Pitted Optical Servo Tracks and Method for Stamping the Tracks on the Media," discloses a method for "stamping" the servo tracks on the magnetic medium. Essentially a master stamping disk is produced bearing a template of the optical servo pattern. This master disk is then pressed against the magnetic floppy disk under a pressure of several tons per square inch. The significant amount of pressure transfers the servo track pattern from the master disk to the floppy.

U.S. Pat. No. 4,633,451, entitled "Optical Servo for Magnetic Disks," discloses a method of providing optical servo information on a magnetic medium consisting of a multi-layer film. The optical servo tracks are formed on the multi-layer film by laser heating the structure to cause a reaction or interdiffusion to occur between layers. The reaction produces a reflectivity contrast of about eight percent (8%) between exposed and unexposed areas. Other methods for preparing the servo tracks are mentioned including contact printing, embossing, and lithography.

U.S. Pat. No. 4,961,123, entitled "Magnetic Information Media Storage with Optical Servo Tracks," discloses a preferable method and apparatus for etching the pattern on a disk using a focused beam of light. The magnetic disk is placed on a platen/spindle assembly and rotated. A beam of light is focused to a small spot on the spinning disk. The focussed beam has sufficient intensity to ablate the disk surface at the point of incidence, thereby reducing the reflectivity of the surface at that point. The beam can be left on during an entire revolution to produce a continuous groove or can be modulated on and off through one revolution to produce a stitched pattern. This method has several advantages. First, the intensity of the focussed beam of light can be adjusted for different types of magnetic media. Secondly, different stitched patterns can be etched simply by varying the on-off time of the beam or by varying the speed of rotation of the disk. Additionally, there is no need to produce a master disk, as with the stamping method.

As mentioned above, the optical servo pattern often comprises a number of equally spaced concentric optical servo tracks about the rotational axis of the disk. A single disk may have as many as 900 concentric servo tracks. Additionally, each optical servo track may be a continuous groove, or alternatively, may comprise a plurality of equally spaced stitches. When a stitched pattern is employed, the number of stitches in each optical servo track may exceed 1600 with each track having the same number of stitches. It is crucial for proper servo positioning that every stitch be sufficiently detectable by the servo optics. As mentioned, a preferred method of producing a stitched pattern is by focusing a beam of light on a rotating disk and modulating the beam on and off. The beam, when incident upon the surface of the disk and properly focused, has sufficient intensity to etch the surface thereby creating a stitch having reduced reflectivity.

Magnetic disks of this type are engaged and centered in disk drives by a stamped, metal central hub to which the disk is attached with adhesive. This hub has a center rectangular hole through which the center pin is engaged and a skewered rectangular hole off of the disk center through which an alignment pin fits. During the etching of the servo tracks, it is necessary that the magnetic disk be correctly aligned with respect to these holes, so that the servo tracks will be laid down accurately for proper optical reading during operation of the disk drive.

SUMMARY OF THE INVENTION

In accordance with the present invention, the magnetic disk on which optical servo tracks are to be etched is automatically positioned on a spindle by a pressurized source of gas which rotates the disk until an alignment pin engages an alignment hole in the disk and until a corner of the disk center hole is correctly positioned against the center pin.

The center pin is longer than the alignment pin so that the disk can be placed on the center pin without having to align the alignment pin with the disk hub alignment hole. The air pressure system of this invention rotates the disk until the hub alignment hole engages with the alignment pin. This increases the speed of the disk hubbing operation.

In accordance with the present invention, the gas (air) nozzle is placed at the appropriate angle and location relative to the edge of the media to provide a torquing force for the disk. The pressurized air also lifts the disk slightly off the spindle to provide a gas boundry layer while rotating the disk. This protects the media from scratching while being positioned.

In accordance with another embodiment of the present invention, a second gas nozzle is added. The pressurized gas from the second nozzle provides additional torque to rotate the disk. The second nozzle also adds stability.

A small magnet ring is positioned on the spindle below the steel hub of the disk. The magnet provides a slight disk retaining force while the disk is being torqued into the hub locked position.

Further in accordance with the invention, a low-friction outer ring on the spindle allows the outer edge of the disk hub to slide freely while it is being rotated.

Further in accordance with the invention, alignment scales are provided for aligning the laser beam.

The foregoing and further objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
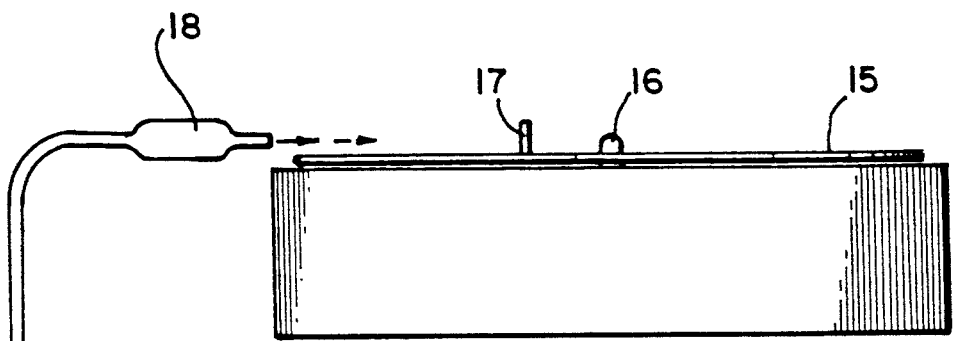
FIG. 1 is a front view of the spindle and pressurized source of air of the present invention.
Figure 1A:
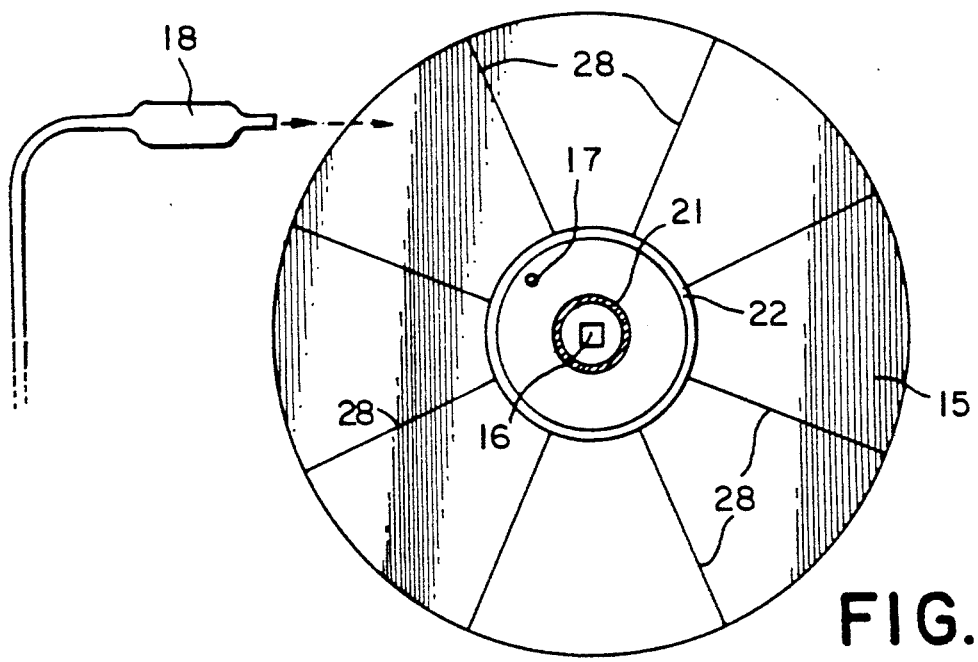
FIG. 1A is a top view of the spindle of FIG. 1.
Figure 1B:
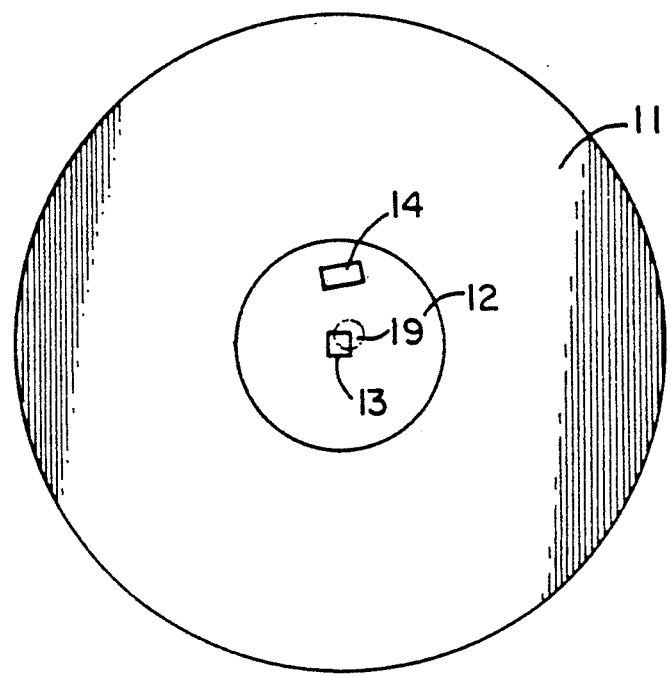
FIG. 1B shows the magnetic disk and its hub.

FIG. 1B depicts the magnetic disk on which optical servo tracks are to be etched. Disk 11 has a stamped metal central hub 12 to which the disk is attached with adhesive. Two holes are punched in the hub. A square (rectangular) center hole 13 engages the center pin of the magnetic disk drive. A larger skewed rectangular alignment hole 14 engages a second pin of the disk drive. The pin through the skewed alignment hole engages an edge of this hole to torque the hub so that the center pin of the disk drive engages in the same corner of the center hole 13 each time. The corner provides a reference point relative to the center of rotation of the disk. This engagement of drive center pin to a hub center hole corner is the mechanism for repeatable and accurate centering of the disk in the drive. This same centering or hub locking process must be performed each time a disk is loaded onto the spindle of the laser etching system used to produce the laser etched servo tracks.

FIG. 1 is a front view of the air bearing spindle upon which the magnetic disk is mounted prior to laser etching of servo groove stitches. The system used to mount and lock the disk to the spindle 15 includes the following features. The spindle 15 includes a disk center pin 16 and an off-center alignment pin 17. The top of center pin 16 is crowned with a smooth radius. The top of the alignment pin 17 is slightly shorter than the crown of center pin 16. This pin configuration allows the operator to place the disk on the center pin 16 of the spindle 15 without having to align the alignment pin 17 with the alignment hole 14.

A pressurized gas nozzle 18 is directed at the edge of the disk. For example, a pressurized air source is used such as a tank of compressed air 24. When a burst of pressurized air is released, the disk placed on the spindle 15 is torqued in a clockwise direction, until the alignment hole 14 in the disk hub 12 engages with the spindle alignment pin 17. Once engaged, the disk is further torqued until the alignment pin 17 rests tightly against the outer edge of the alignment hole 14. This positions the spindle's center pin 16 tightly against the two edges of the hub center hole 13 at the corner 19 (FIG. 1B). With this action, the disk is centered or "hub locked" in a position to be laser etched.

The pressurized air nozzle 18 is placed at the appropriate angle and location relative to the edge of the disk to apply a torquing force to the disk. The pressurized air also lifts the disk slightly off the spindle 15. This produces a gas boundry layer while rotating the disk. This provides the disk with a degree of protection from scratching while it is being positioned.

A solenoid 20 controlled by computer 26 enables the burst of gas to be correctly directed to torque and lock the hub 12 of the disk into position. The computer controlled burst of air provides positive media hub locking until the rotation speed of the spindle 15 is high enough so that the spindle's positon retention system is able to retain the hub locked disk in position.

Referring now to FIG. 1A, a top view of the apparatus is shown which illustrates further details of the apparatus. A small magnetic ring 21 is on the spindle 15 just below where the steel hub of the disk rests when it is placed on the spindle 15. The magnet 21 provides a slight disk retaining force while the disk is being torqued into the hub locked position. This provides an added margin of reliability to the operation. A low-friction bearing ring 22 of teflon is under the disk hub 12. The bearing ring 22 is at the outer edge of the center circular counterboard area of spindle 15. The lowest physical plane on the side of the disk resting on the spindle 15 is located on the outer radius or edge of the disk hub 12. This plane slides freely on the teflon bearing ring 22 while the hub 12 is rotated into the hub locked position.

A spindle retention system, like that used in the aforementioned Insite system, comprises a series of radial cut troughs 28 in the spindle surface upon which the disk rests. As the rotational speed of the spindle increases, an airflow is generated from the center of the spindle through these troughs. This airflow in turn creates a downward suction force on the disk due to a drop in static pressure in these troughs. This downward force retains the disk in the hub lock position for the duration of the etching cycle.

Figure 1C:
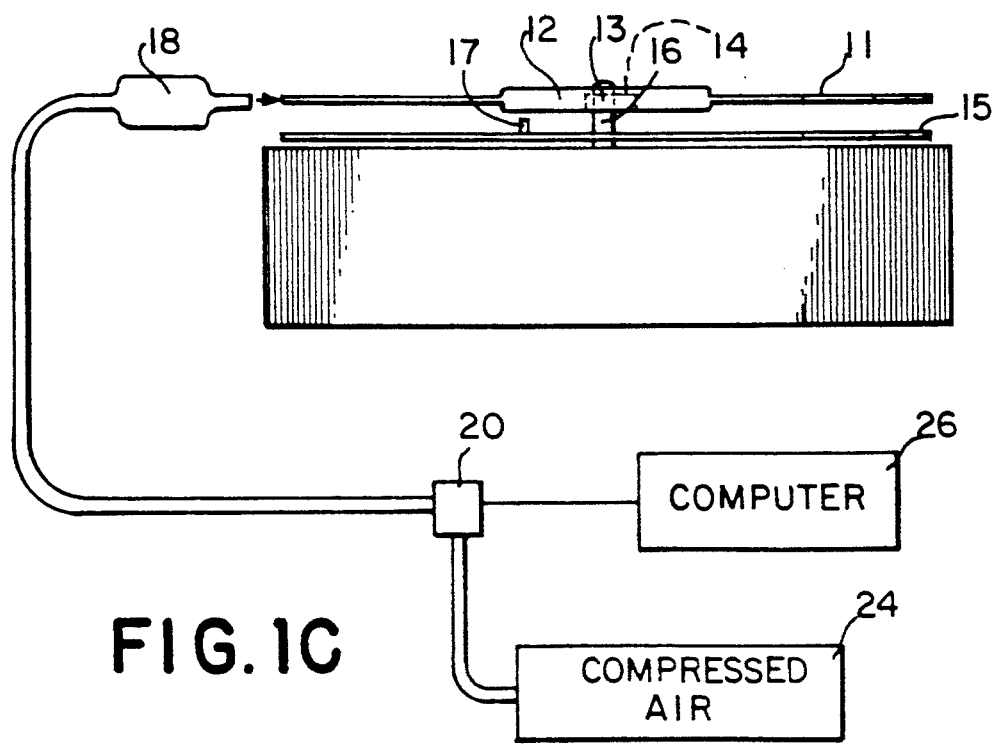
FIG. 1C shows a magnetic disk mounted on the spindle of FIG. 1.

FIG. 1C shows the disk 11 mounted on the spindle 15. In the figure, the alignment pin 17 has not yet engaged the alignment hole 14 in the disk hub 12. A burst of pressurized air from the nozzle 18 will torque the disk in a clockwise direction, until the alignment hole 14 in the disk hub 12 engages with the spindle alignment pin 17. As described above, once engaged, the disk 11 is further torqued until the alignment pin 17 rests tightly against the outer edge of the alignment hole 14.

Figure 2:
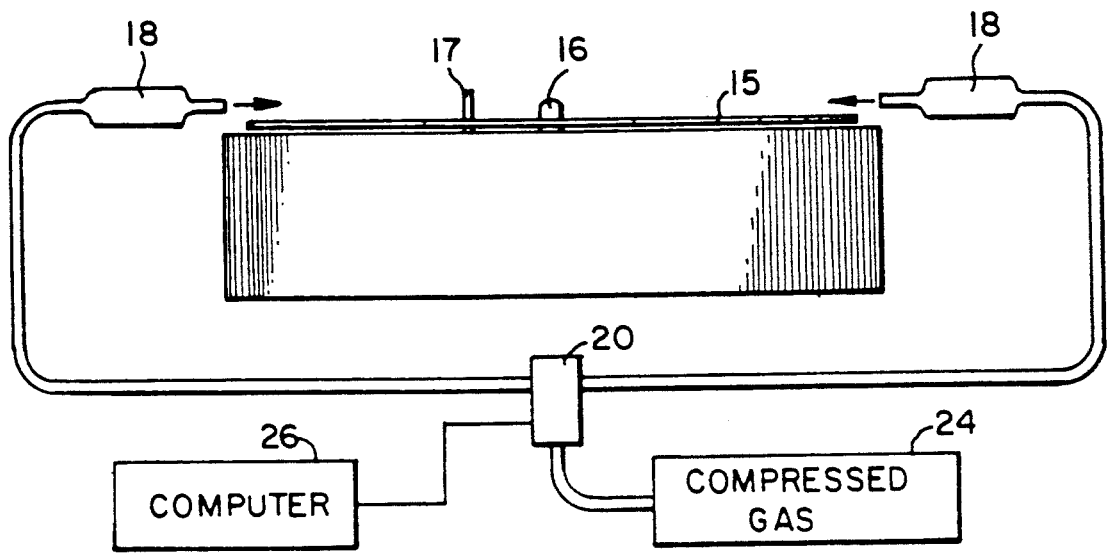
FIG. 2 is a front view of an alternate embodiment of the present invention with two pressurized sources of air.
Figure 2A:
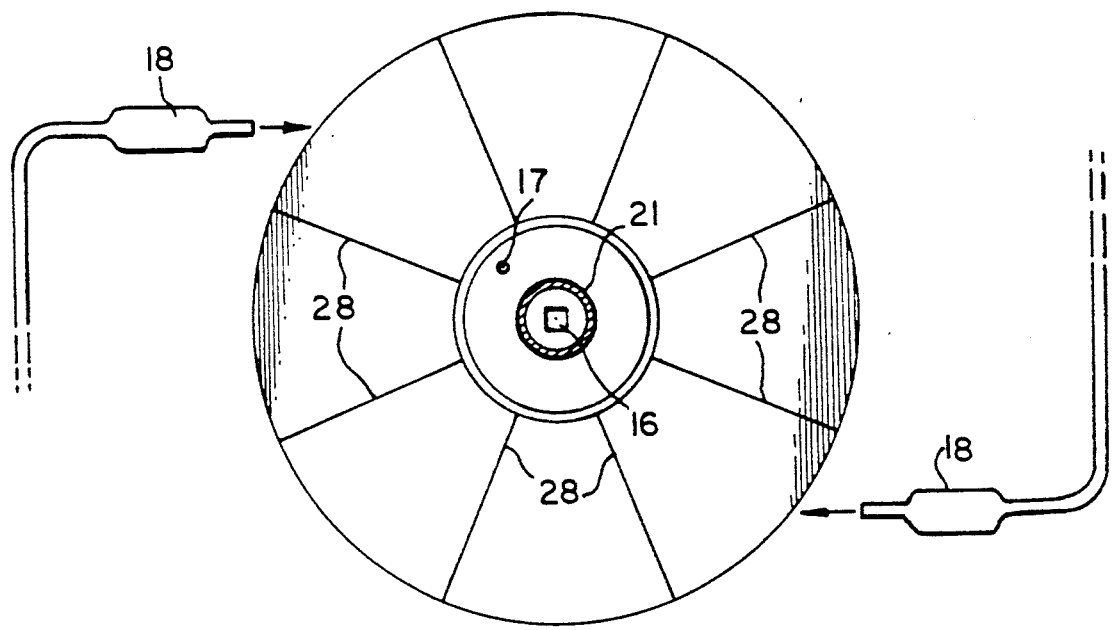
FIG. 2A is a top view of the alternate embodiment shown in FIG. 2.

FIG. 2 is a front view of an alternate embodiment of the present invention. In the alternate embodiment, the nozzle 18 defines a first nozzle, and the apparatus further comprises a second nozzle 30. The second nozzle 30 operates substantially simultaneously with the first nozzle and provides further torque to the disk. The second nozzle 30 also acts to equalize the torque on the disk. FIG. 2A best shows the preferred positioning of the second nozzle 30 relative to the spindle 15 and the first nozzle 18.

Figure 3:
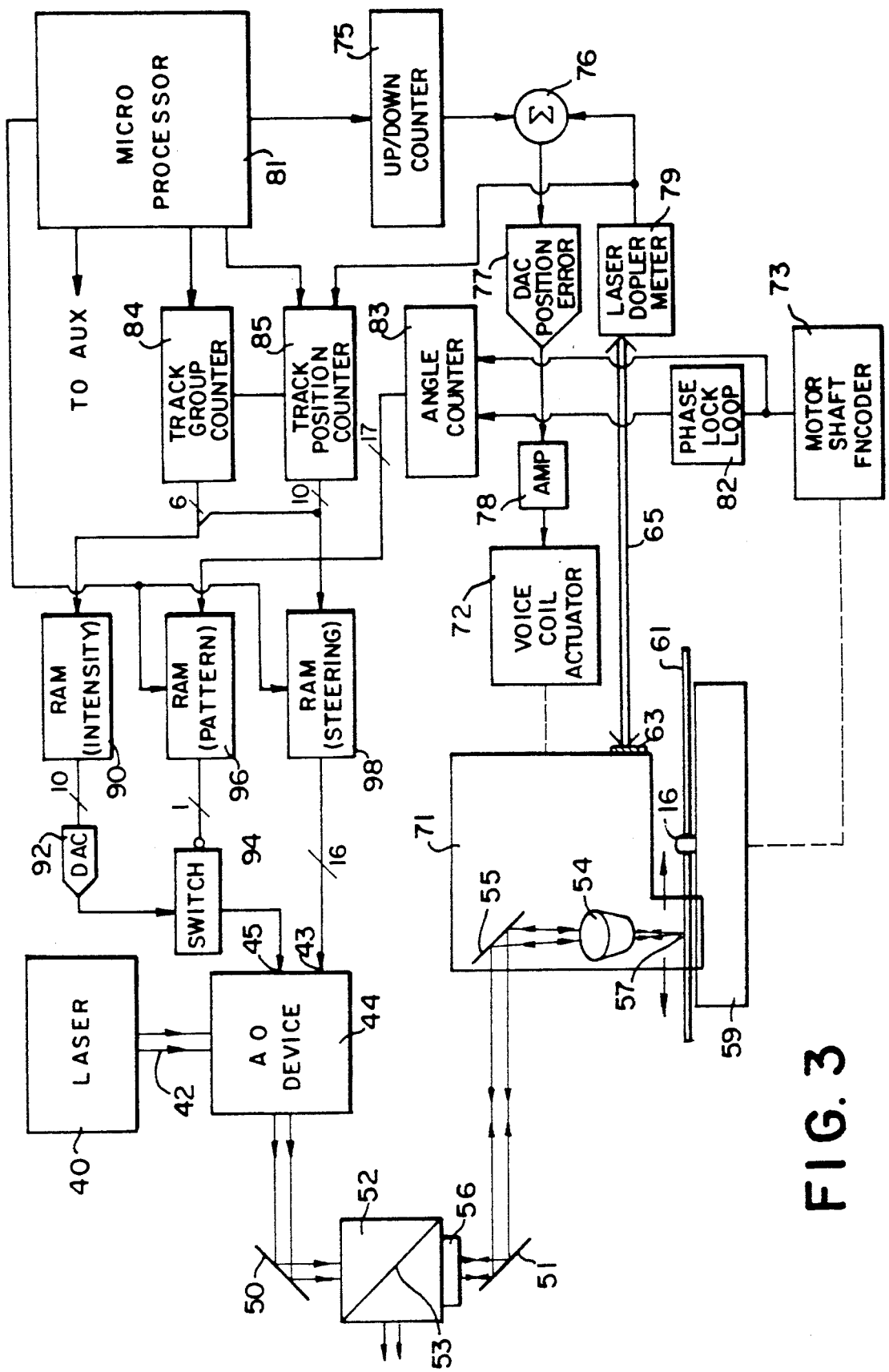
FIG. 3 is a block diagram of the apparatus for etching optical servo information on magnetic disks.

FIG. 3 shows a preferred embodiment of the complete apparatus for etching the magnetic disk. The apparatus includes a light source 40 for etching a plurality of concentric optical servo tracks about the rotational axis of a magnetic storage disc wherein each track comprises a plurality of equally spaced etched stitches.

Light source 40 provides a collimated incident beam of light 42. The light source 40 has means (not shown) for linearly polarizing the incident beam of light in a first polarizing direction. The direction of linear polarization, i.e., the first polarizing direction, is not critical. In the preferred embodiment, the light source 40 is a laser tuned to a wavelength suitable for etching the incident surface of the magnetic medium. Thus, the incident beam is highly collimated and monochromatic. Different wavelengths may be used with magnetic media having different characteristics. Two brewster windows (not shown) in the laser tube comprise the means for linearly polarizing the incident beam.

An acousto-optical device 44 adjusts the intensity of the incident beam and steers the beam for reasons which will become evident hereinafter. Acousto-optical devices are described generally in Wilson & Hawkes, OPTOELECTRONICS: AN INTRODUCTION, pp. 111 to 116 (Prentice/Hall 1983). The Acousto-optical (AO) device 44 is described hereinafter in greater detail. Briefly, the AO device 44 accepts digital frequency data at a first input 43 and analog voltage data at a second input 45. The frequency data and voltage data control the frequency and amplitude, respectively, of an ultrasonic wave applied to a birefringent crystal in the device 44 which changes the index of refraction of the crystal in one direction. Changes in the frequency of the ultrasonic wave produce deflections of the incident beam as it travels through the crystal. Changes in the amplitude of the ultrasonic wave create corresponding changes in the intensity of the beam.

Mirror 50 directs the linearly polarized incident beam through a beam separator 52. Beam separator 52 has means for transmitting light linearly polarized in the first polarizing direction (as is the incident beam) and for deflecting light linearly polarized in a direction orthogonal to the first polarizing direction. In the preferred embodiment, the means for transmitting light linearly polarized in the first polarizing direction and for deflecting light polarized orthogonal thereto is a multilayer dielectric thin film laser line coating 53 positioned along the hypotenuse of the beam separator 52.

The beam separator 52 transmits the linearly polarized incident beam and mirrors 51, 55 direct the transmitted incident beam to an objective lens 54. The lens 54 focuses the incident beam to a point 57 on a magnetic storage disk 61 to be etched. A platen/spindle assembly 59, which includes the features of the present invention described in conjunction with FIGS. 1 and 2, rotates the disk 61 about its rotational axis. The lens 54 is positioned such that the rotating disc lies substantially in the focal plane of the lens 54. The focused incident beam reacts with the rotating magnetic medium 61 at the point 57 to create a stitch (not shown) on the medium 61 having reduced reflectivity. A portion of the focused incident beam is reflected. Since the incident beam is focused to a fine point on the magnetic medium, the reflected light effectively emanates from a point source. As described above, the rotating disk 61 lies in the focal plane of the lens, and therefore, the point source of reflected light lies at the focal point of the first lens 54. Consequently, the lens 54 operates to collimate the reflected light and direct a reflected beam back toward the beam separator 52 via the mirrors 51,55. The reflected beam is used for etch verification as is more fully described in co-pending U.S. patent application Ser. No. 896,197, entitled "Apparatus for and Method of Verifying Etching of Optical Servo Information on Magnetic Media".

A voice coil actuator 72 moves the optics 71 which generate the beam of light so that the beam moves radially of the disk for etching each of the concentric servo tracks. In the preferred embodiment, the beam of light is moved continuously radially of the disk 61. The actuator 72 is moved by a closed loop positioning system which comprises up/down count generator 75, counter 76, digital-to-analog converter 77 and laser Doppler meter 79. To initiate movement, microprocessor 81 loads a value into the up/down count generator 75. The up/down count generator 75 produces a pulse train having a given number of pulses at a given velocity for indicating desired position. These pulses increment or decrement the counter 76 depending upon the desired direction of movement. The output of the counter 76 drives the digital-to-analog converter 77 which generates an error voltage. An amplifier 78 provides compensation and current amplification. Amplifier 78 causes current to flow in the voice coil actuator 72, causing the actuator 72 to move in the desired direction. This movement is detected by the laser Doppler meter 79, which feeds back the new position. This signal causes the counter 76 to increment or decrement back to the zero position.

In the preferred embodiment, the incident beam is moved continuously radially of the disk 61. Because the optics 71 which generate the incident beam are continuously moving radially of the disk, the acousto-optical device 44 is used to steer the incident beam in order to maintain the beam in the concentrical pattern of the track being etched.

The radial position of the optics 71 during the etching of a given servo track (i.e., an etch cycle) is encoded by the laser Doppler meter 79. A bi-directional laser beam 65 that strikes a retro-reflector 63 on the optics 71 provides positioning information to the laser Doppler meter 79. The resolution of the laser Doppler meter 79 is adjustable. In the preferred embodiment, the laser Doppler meter 79 is adjusted to discern movement of the optics 71 in increments of 1/516 of the track-to-track distance $t_d$. As the optics 71 move radially through each 1/516th increment during the etching of a track, the laser Doppler meter 79 increments a track position counter 85. The track position counter 85, therefore, maintains a count which indicates the radial position of the optics 71 during an etch cycle. The counter 85 is reset at the beginning of each etch cycle.

Acousto-optical device 44, which is used to steer the beam, is controlled by sets of digital steering signals retrieved from a first random-access-memory (RAM) 98. Each digital steering signal stored in the first RAM 98 represents the beam angle $\alpha$ required for a particular radial position of the optics 71 during an etch cycle. In the preferred embodiment, there are 516 steering signals stored in the first RAM 98—one for each of the 516 positions encoded by the laser Doppler meter 79 during an etch cycle. The output of the track position counter 85 provides the memory address of the appropriate stored signal for a given radial position. The acousto-optical device 44 responds to the retrieved steering signals to steer the beam to maintain the beam in the concentrical pattern of the track being etched.

The AO device 44 is controlled by sets of digital intensity signals retrieved from a second random-access-memory (RAM) 90. The sets of digital intensity signals are selected under control of microprocessor 81 and in response to the radial position of the incident beam relative to the disk 61. The digital intensity signals are converted to an analog voltage signal by a digital-to-analog converter (DAC) 92. For purposes described more fully below, the analog voltage signal passes through an analog switch 94 which performs a gating function in response to the output of a third random-access-memory (RAM) 96. The analog voltage signal then passes from switch 94 to the AO device 44. The AO device 44 is responsive to the amplitude of the analog signal from DAC 92 to adjust the intensity of the incident beam transmitted through the device 44.

The digital intensity signals are stored in a table in the second RAM 90 as a function of the radial position of the beam. In addition, because beam steering angle can affect the energy density delivered by the beam, the intensity signals are also a function of beam steering angle. The intensity signals are retrieved and applied to the device 44 using a memory-mapped approach similar to that described above for the steering signals.

Figure 4:
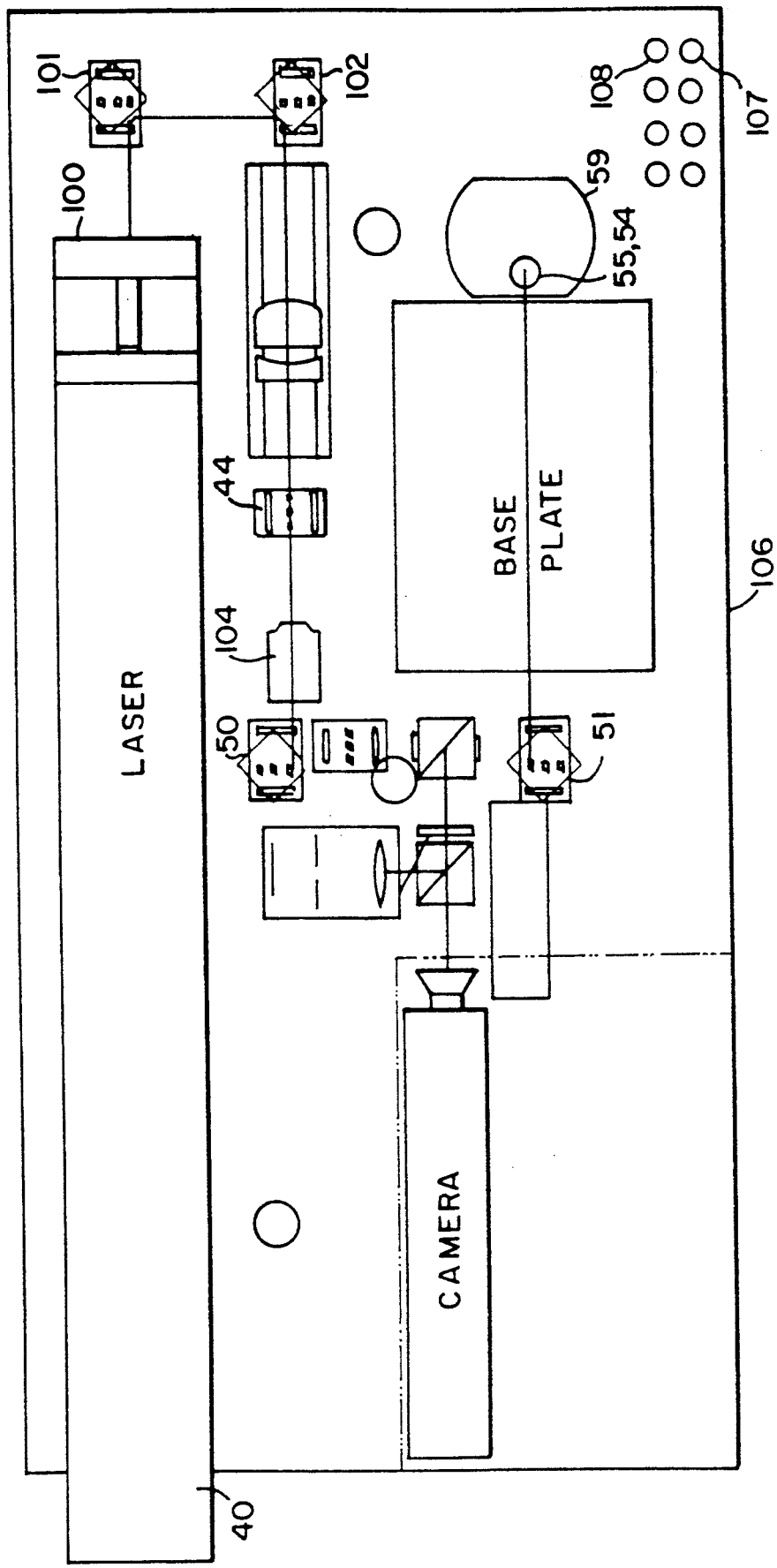
FIG. 4 shows the optical bench layout.

FIG. 4 shows the optical bench layout for the system of FIG. 3. Like elements have the same reference numerals as in FIG. 3. The system further comprises a laser shutter 100, mirrors 101 and 102, beam aligner 104, and aperture stop 105. All of the components of the apparatus are mounted on a vibration isolated steel bench 106 which has regularly spaced holes over the entire surface of the bench. Holes are indicated at 107 and 108. The components are positioned on the bench with respect to the regularly spaced index holes.

The laser beam is passed through and reflected off of an assortment of electro-optical and optical components prior to being focused onto the disk. In order to make the system operational, the laser beam must be aligned to these components. The laser beam must be aligned with regard to the angular path of travel in the horizontal and vertical planes. Deviations in these angles translate into changes in beam height above the optical bench 106 and divergence from the beam's paths. In order to provide a repeatable and straightforward method to form this alignment, an alignment scale of this invention is provided.

Figure 5:
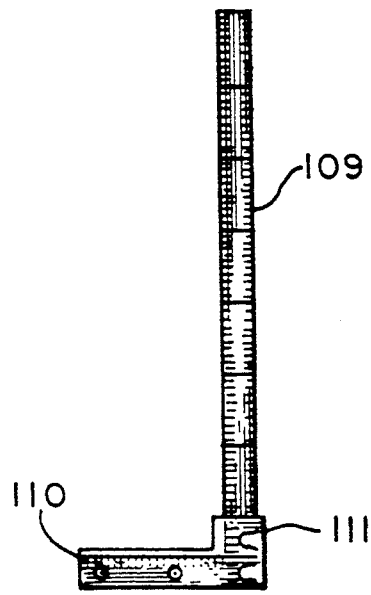
FIGS. 5, 5A and 5B show the alignment scales and holders.
Figure 5A:
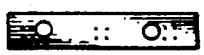

FIG. 5 shows the vertical alignment scale 109 and the horizontal alignment scale 110 in a magnetic holder 111. The magnetic base 111 holds the scales in place after they are positioned on the steel optical bench surface 106. The scales 109 and 110 are longer than the equally spaced index holes 107, 108 on the optical bench surface. (In the example under consideration, the holes are on one inch centers). This allows for accurate placement of the scales on the optical bench surface because the scales are indexed off the hole locations.

Figure 5B:
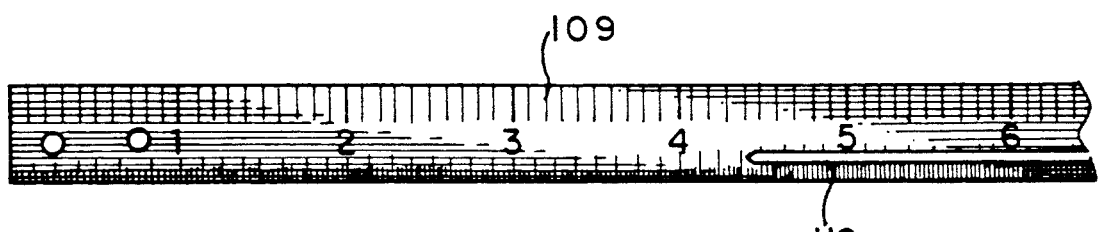

Vertical scale 109 is longer than the maximum height above the optical bench 106 which the laser beam is required to travel. Vertical scale 109 is shown in more detail in FIG. 5B. It has a slot 112 which is slightly narrower than the laser beam diameter. This allows the slot to catch and make visible the laser beam. The person aligning the laser beam sees the edges of the beam on the scale. The slot 112 is milled along the vertical axis of the scale and has a length which encompasses all laser beam heights required in the system.

The pair of scales 109 and 110 and their slots define either a plane or an axis of travel for the laser beam which is to be aligned using the various fold mirror pitch and roll adjustments of the optics.

Figure 6:
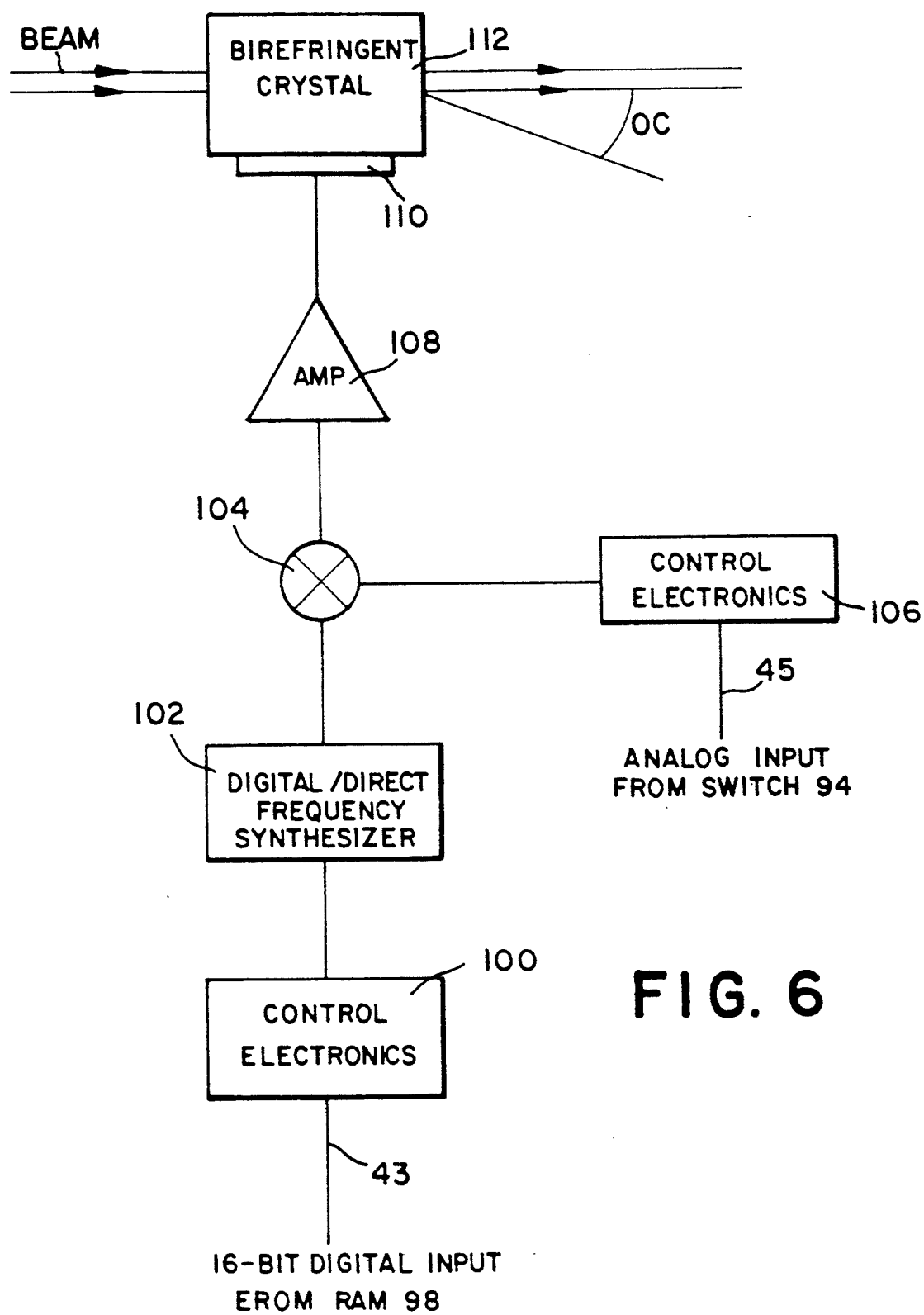
FIG. 6 is a block diagram showing further details of the acousto-optical device of FIG. 3.

Referring now to FIG. 6, the acousto-optical device 44 of FIG. 3 is shown in greater detail. The device 44 accepts the 16-bit digital signals retrieved from RAM 98 (FIG. 3) at a first input 43. The device 44 accepts the analog voltage signal from switch 94 (FIG. 3) at a second input 45. The 16-bit digital signals (i.e., words) are received by control electronics 100 and fed to a digital/direct frequency synthesizer 102. The frequency synthesizer 102 produces a fixed amplitude oscillating signal having a frequency which varies in response to, and proportional to, the digital values of the 16-bit signals from the RAM 98 (FIG. 3). The oscillating signal is fed to modulator/mixer circuit 104.

The analog voltage signal is received by control electronics 106 which condition the signal and pass the signal to the modulator 104. The amplitude of the analog voltage varies from 0 to 1 volts. The modulator/mixer 104 amplitude modulates the oscillating signal from the synthesizer 102 with the analog voltage signal. The output of modulator/mixer 104 is fed to amplifier 108 which amplifies the signal and feeds it to a transducer 110 which is coupled to a bi-refringent crystal 112. The transducer 110 produces an ultrasonic wave having the same frequency/amplitude characteristics as the electronic signal from the modulator/mixer 104. The ultrasonic wave is applied to the birefringent crystal 112. The incident beam is directed through the crystal 112. The ultrasonic wave changes the index of refraction of the crystal in one direction. The frequency of the ultrasonic wave controls deflection or steering of the incident beam as it travels through the crystal, while the amplitude of the ultrasonic wave controls the intensity of the beam that exits from the crystal.

Thus, as described above, the 16-bit digital signals from RAM 98 (FIG. 3) control the steering angle of the incident beam as it passes through the device 44. The analog signal generated by the digital-to-analog converter 92 in response to the digital signals retrieved from RAM 90 controls the intensity of the incident beam.

The device 44 was manufactured by Neos Corp., Melbourne, Fla. Typically, acousto-optical devices use a voltage controlled oscillator (VCO) to control the frequency of the signal fed to the transducer 110. In accordance with the present invention, however, the typically employed VCO was replaced with the digital/direct frequency synthesizer 102. The synthesizer 102 achieves a much higher frequency stability, and therefore beam steering stability, over time and temperature. Such enhanced frequency/steering stability is necessary to achieve the tight stitch width and placement tolerances required in accordance with the present invention.

While a particular embodiment of the invention has been shown and described, various modifications of the invention are within the true spirit and scope of the invention. The appended claims are, therefore, intended to cover all such modifications.

What is claimed is:

1. Apparatus for etching a plurality of optical servo tracks about the rotational axis of a magnetic storage disk in relation to magnetic tracks on said disk, said disk being mounted on a hub having a rectangular center hole for engagement with a magnetic disk drive and an alignment hole spaced radially of the center of said disk hub comprising:
   optics for generating a beam of light for etching said optical servo tracks;
   a spindle for rotating said disk in proximity to said optics;
   a center pin at the center of rotation of said spindle;
   an alignment pin which is off-center of said spindle, said alignment pin being shorter than said center pin; and
   a pressurized gas nozzle for directing bursts of pressurized gas toward the edge of a disk which is placed on said spindle with said center pin through said center hole, said pressurized gas applying torque to said disk to rotate it until said alignment hole engages said alignment pin.

2. The apparatus recited in claim 1 wherein said pressurized gas nozzle defines a first pressurized gas nozzle and further comprising a second pressurized gas nozzle for directing bursts of pressurized gas toward the edge of the disk, said second nozzle operating substantially simultaneously with said first nozzle, said pressurized gas from said second nozzle applying additional torque to said disk.

3. The apparatus recited in claim 1 wherein said center hole in said disk is rectangular with a corner of said rectangle providing a reference point relative to the center of rotation of said disk and wherein said pressurized gas positions the disk with the two edges of said said corner against said center pin.

4. The apparatus recited in claim 1 wherein said alignment hole is rectangular and wherein said pressurized gas rotates said disk until said alignment pin abuts the outer radius edge of said alignment hole.

5. The apparatus recited in claim 1 wherein said hub of said disk is of a magnetic material, further comprising:
   a magnetic ring on said spindle below said hub, said magnetic ring exerting a retaining force on said hub while said disk is being rotated into a position in which said hub is locked.

6. The apparatus recited in claim 1 further comprising a low friction ring on said spindle, said low friction ring being positioned to contact the edge of the hub of a disk placed on said spindle, so that it may slide freely while being rotated by said air pressure.

7. The apparatus recited in claim 1 wherein said pressurized gas is directed at the edge of said disk to lift the disk off the spindle with a gas boundry layer while said disk is rotated.

8. The apparatus recited in claim 1 wherein the top of said center pin is crowned with a smooth radius.

9. The apparatus recited in claim 1 further comprising:
   an optical bench;
   means for adjustably mounting said optics on said bench; and
   alignment scales positioned on said bench for aligning said beam of light with respect to said spindle by adjusting said optics.

10. The apparatus recited in claim 9 wherein said alignment scales include a vertical scale having marks indicating the height above said bench, said vertical scale being placed in the path of said beam of light so that said optics can be adjusted to place said beam at the proper height.

11. The apparatus recited in claim 10 wherein said vertical scale has a slot which is slightly narrower than the width of said beam of light so that said beam is visible on said scale.

12. The apparatus recited in claim 9 wherein said bench is a vibration isolated steel bench and further comprising:
   magnetic holders for said alignment scales so that said scales can be movably positioned on said bench.

13. The apparatus recited in claim 12 wherein said bench has a plurality of index holes for positioning said optics and wherein said alignment scales comprise a horizontal scale for positioning said optics with said last named holes as a reference.

* * * * *